United States Patent [19]

Handel

[11] 4,137,766

[45] Feb. 6, 1979

[54] INTEGRAL FIELD MAGNETIC FLOWMETER

[75] Inventor: Neil E. Handel, Foxboro, Mass.

[73] Assignee: The Foxboro Company, Foxboro, Mass.

[21] Appl. No.: 822,473

[22] Filed: Aug. 8, 1977

[51] Int. Cl.² ............................................. G01F 1/58
[52] U.S. Cl. .............................................. 73/194 EM
[58] Field of Search ................................. 73/194 EM

[56] References Cited

U.S. PATENT DOCUMENTS

| 3,902,366 | 9/1975 | Gruner | 73/194 EM |
| 3,965,738 | 6/1976 | Watanabe | 73/194 EM |
| 4,010,644 | 3/1977 | Bonfig et al. | 73/194 EM |

OTHER PUBLICATIONS

P. C. Eastman et al., "A Magnetic Flowmeter with Concentric Electrodes", Instrumentation Technology, Jun. 1970, pp. 52–55.

Primary Examiner—Charles A. Ruehl
Attorney, Agent, or Firm—Andrew T. Karnakis

[57] ABSTRACT

A magnetic flowmeter includes a field coil extending along the longitudinal axis of a flow conduit for generating an integral magnetic field concentrically located about the coil and perpendicular to the flow. An inner electrode surrounds the coil, and the conduit itself is used as the other electrode, thereby providing a large surface-area electrode for sensing flow induced voltages. High current (over 20 amperes), very short duration (less than 10 millisecond) pulses energize the field coil whose inductance is low enough to permit electrode output voltages to be read within a few milliseconds after the magnetic field current pulse is turned on. The measured output voltage comprises a short-pulse, flow induced component proportional to flow rate, superimposed on a d-c voltage approximately equal to the galvanic potential at the electrodes. In a preferred embodiment, a pulse transformer, connected between the sensing electrodes and the readout circuitry, passes the flow induced component, while at the same time isolating the d-c component, thereby producing at its output a signal representing the actual flow signal. In an alternate embodiment, two voltage readings are sampled, one when the magnetic field is at steady-state on value, the other after the field current is turned off. Since these two readings are within milliseconds of one another, they are simply subtracted to produce the actual flow signal without having to compensate for any drift in the galvanic d-c voltages.

22 Claims, 12 Drawing Figures

INTEGRAL FIELD MAGNETIC FLOWMETER

FIELD OF THE INVENTION

This invention relates to apparatus for measuring flow rate, particularly to magnetic flowmeters.

BACKGROUND OF THE INVENTION

Magnetic flowmeters, in which a conductive fluid flows through a transverse magnetic field of given density to produce a voltage between a pair of electrodes that is proportional to the flow rate, have been used for some time. These meters operate on the well established principle that the voltage generated is perpendicular both to the magnetic field and to the direction of flow.

A majority of the commercially available magnetic flowmeters contain two small electrodes that are flush mounted within a flow conduit on opposite sides thereof. A magnetic coil and core assembly are externally mounted on the conduit so as to create a magnetic field that passes through the conduit substantially at right angles both to the flow and to the position of the electrodes.

It has also been proposed to create an internal, concentric magnetic field by centering a current-carrying conductor along the longitudinal axis of the conduit (i.e., aligned with the direction of flow). In this type of axial-current magnetic flowmeter, referred to as an integral (i.e., self-contained) field magnetic flowmeter, the output voltage is developed along an axis perpendicular both to the direction of flow and the magnetic field and detected between a pair of concentric electrodes located within the field. For magnetic fields generated by such an axial current, the field intensity at any point in the flow conduit is inversely proportional to the radial distance of that point from the effective mean axis of the current.

One form of flowmeter utilizing an integral field generated by a current-carrying conductor is shown in an article published in the June 1970 issue of Instrumentation Technology entitled "A Magnetic Flowmeter with Concentric Electrodes" by P. C. Eastman et al. In that device, a metal tube enclosing the conductor is welded into a pipe for use as a central electrode. A cylindrical outer electrode mounted to the pipe wall surrounds the conductor. Since the tube is electrically grounded to the pipe, a non-conductive liner must be attached to the interior of the pipe to insulate the outer electrode therefrom to establish a potential across the two electrodes for sensing the flow induced voltage. Liners are expensive to manufacture and install, and pose significant problems with respect to bonding and sealing under certain flow rate conditions, and therefore are not readily adaptable for placement in existing pipe lines in a process control field.

In the design of a magnetic flowmeter, the magnetic field generated may be either alternating or direct. However, the use of an a-c field excitation increases the sensitivity of the measured output flow rate signal to variations in line voltage, frequency and harmonic distortions, as well as inductively or capacitively coupled spurious voltage signals unrelated to flow rate. In addition, large a-c input current levels are required to produce a field of sufficient intensity, involving an attendant increase in energy dissipation.

If direct magnetic flux is employed, other drawbacks are encountered. The d-c signal current tends to cause polarization of the electrodes that builds up proportionally with the duration of the current. This polarizing effect increases the ohmic impedance of the electrodes and has a more significant effect on electrodes having small surface areas.

Also electrochemical or galvanic potentials that vary with time are present at the electrodes. In fact, under certain flow conditions significant changes in these voltages can occur in fractions of seconds. Since the flow rate signal is superimposed on these electrochemical voltages, some means must be provided for separating the two voltages, or compensation for the shift in the baseline must be built into the measurement circuitry to preserve output accuracy.

An additional method for creating the magnetic field is disclosed in U.S. Pat. No. 4,010,644 in which a pulsed d-c signal current is utilized. Such a method has certain advantages over a-c or constant d-c field excitation, namely reducing energy consumption and minimizing the effects of a-c line voltages, inductively coupled spurious output signals, and polarization. However, because of the long time constants associated with the field windings of that prior art device, the effects of shifting electrochemical voltage must be taken into account. Thus, the aforementioned U.S. Pat. No. 4,010,644 is primarily concerned with a method of compensating for these perturbing d-c voltages when using a pulsed d-c field. However, this method involves additional expenditure in circuitry and overall complexity for making the true flow rate measurement.

Still another factor associated with prior art devices is the relatively small size of the sensing electrodes. As mentioned, small electrodes are more susceptible to the effects of polarization. Additionally the produce high output signal impedances that interfere with the ability to measure the flow rate of low conductivity fluids.

Still further, small electrodes generate noisy flow signals that affect output accuracy. This is due to the fact that an element of flow induced voltage in the immediate vicinity of an electrode contributes a disproportionately larger percentage of the total flow rate signal than the same voltage induced in the flowing liquid at a point more remote from the electrode. Since practical flows are almost always turbulent, random velocity variations occur near the electrode which do not reflect the true mean flow velocity in the conduit. Thus magnetic flowmeters using relatively small electrodes produce output flow signals with typically several percent of random noise superimposed which must be filtered to produce usable results. This filtering slows the response of the measurement system.

SUMMARY OF THE INVENTION

In the present invention, a magnetic flowmeter that is both highly accurate and inexpensive to manufacture may be constructed by mounting an electrical conductor generally along the longitudinal axis of a flow conduit, providing around it an electrode, and using as the other electrode the conduit itself.

Energizing the conductor with a current signal creates a magnetic field within the conduit, concentrically located about the conductor and generally perpendicular to the flow. Electronic circuitry connected to both electrodes senses the flow induced voltages and produces an output signal proportional to the flow rate.

In accordance with another important aspect of the invention, the magnetic field is established by high current (e.g., over 20 amperes), very short duration (e.g., less than 10 milliseconds) d-c pulses). Utilizing a field coil with rapid (e.g., less than 2 milliseconds) rise and decay time constants permits electrode output voltages to be read within a correspondingly short period of time after current turn-on when the magnetic field has reached its steady-state on condition. Thus the resultant short-pulse, flow induced voltage signals are more readily transmitted to and processed by the electronic readout circuitry. For example, an isolating pulse transformer, connected in the signal path between the sensing electrodes and the readout circuitry, may be used to pass the flow induced voltage component, while at the same time eliminating galvanic and any other d-c components from the electrode output voltage, thereby producing at its output a signal representing the actual flow signal.

PREFERRED EMBODIMENT

A description of the presently preferred embodiment of the invention is set forth below.

DRAWINGS

FIGS. 6A–F are a series of typical waveforms for the embodiment.

Figure 7:
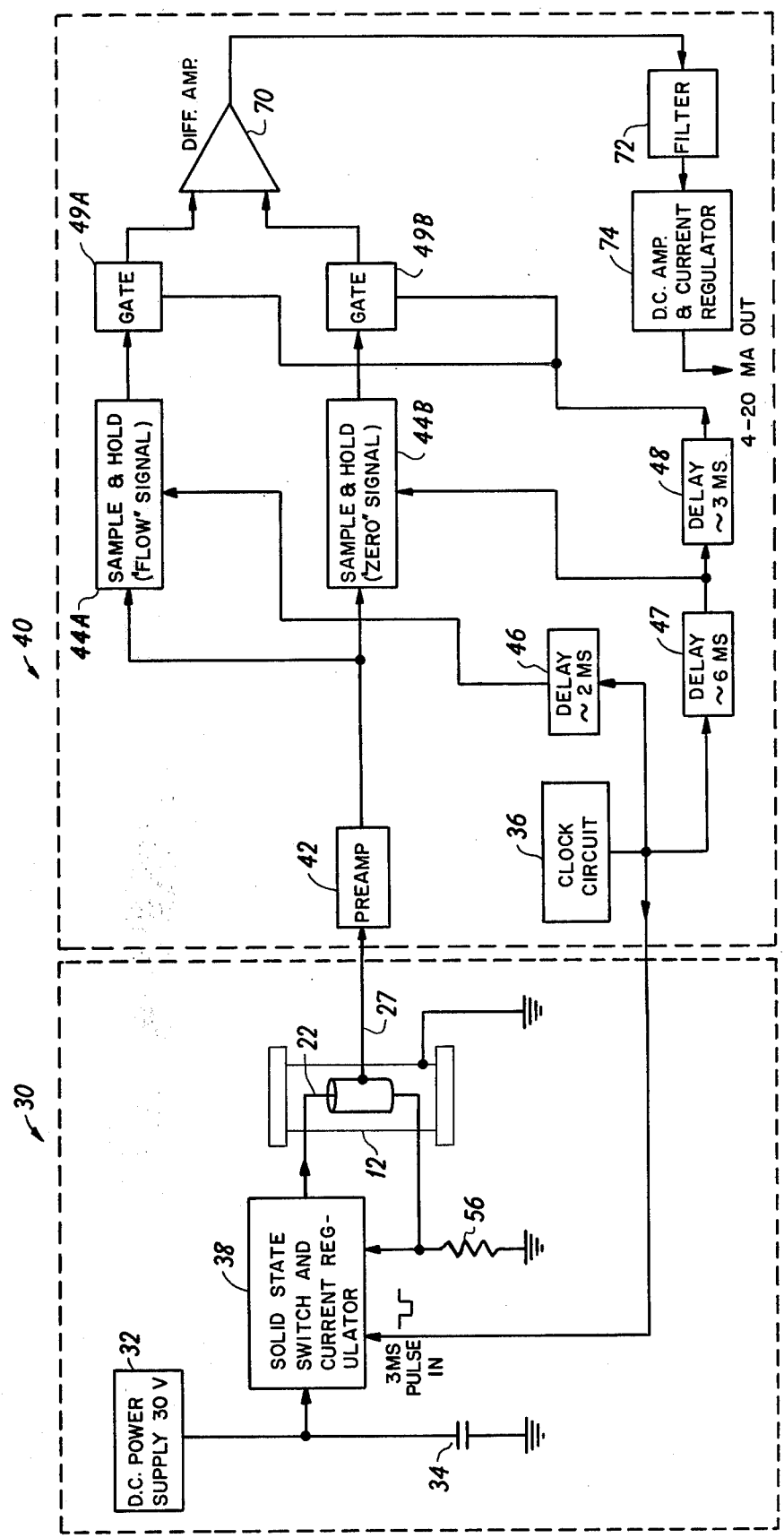

FIG. 7 shows in block diagram format an alternate embodiment for detecting the flow induced voltages.

DESCRIPTION

The embodiment shown in the drawings is constructed and operates as follows.

Figure 1:
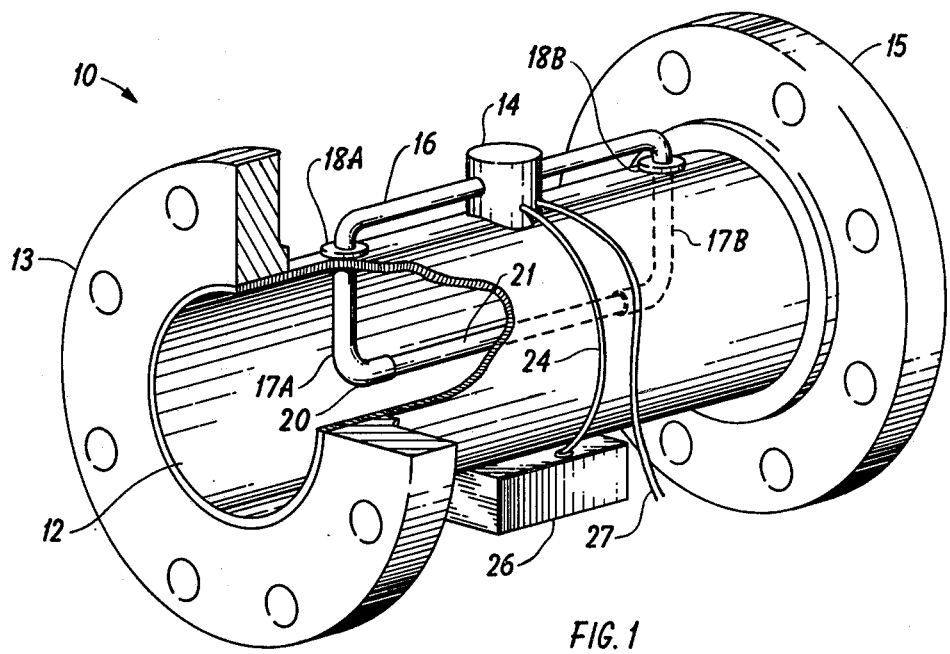
FIG. 1 is a perspective view of a flowmeter built in accordance with the present invention.
Figure 2:
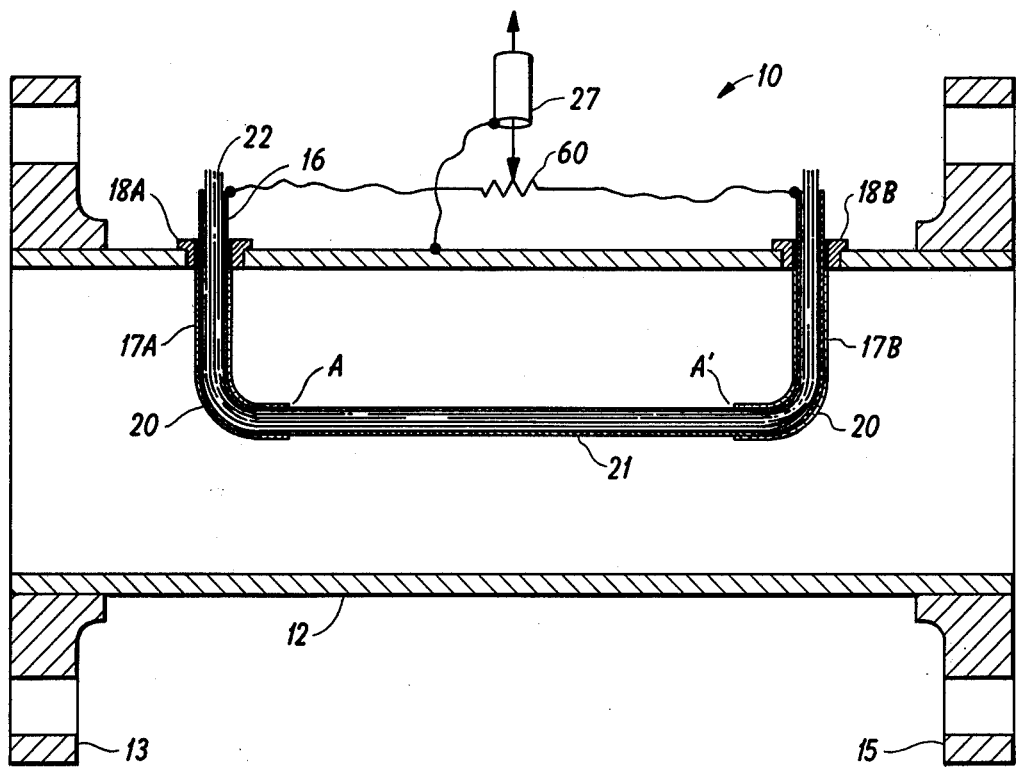
FIG. 2 is a vertical section through the longitudinal axis of the meter of FIG. 1, showing in schematic form the transient balancing system for the embodiment.

Referring now to FIGS. 1 and 2, the magnetic flowmeter 10 includes a section of 4 inch I.D. stainless steel pipe 12 having flanged ends 13, 15. An elongate stainless steel tubular housing 16, which holds a winding of electrical conductors that form a magnetic field coil 22, is mounted at leg segments 17A, 17B that extend through the pipe wall. The legs of the housing are electrically insulated from the pipe by a pair of gland seals 18A, 18B. The length of this tubular housing extends generally along the longitudinal axis of the pipe for a distance twice the pipe I.D. Processing from both seals along the housing up to the points designated as A and A', fluorocarbon shrink tubing 20 insulates all but the central portion of the housing leaving a distance one and one-half times the pipe I.D. exposed to the process fluid.

The field coil 22 is formed by pulling a bundle of twenty-five #17 Formvar insulated wires through the tubular housing 16 and serially interconnecting them within a junction box 14 mounted on the exterior of the pipe 12 to form a twenty-five turn winding. The input side of the coil is connected by cable 24 to a d-c pulse switching network 30 (FIG. 4), which includes a d-c power supply 32 capable of charging a capacitor 34 (0.1 farad) to approximately 30 volts, all positioned within a casing 26 mounted on the pipe diametrically opposite the junction box. The switching network, which provides the current drive for producing a magnetic field of known intensity, the flow tube and associated field coil, together with the electrodes for sensing the flow induced voltage signal, constitute the primary element of the magnetic flow measurement system. The use of a twenty-five turn winding reduces the amount of input current required to obtain usable output signals to a level well within the range of readily available solid state switching and regulating devices.

Figure 4:
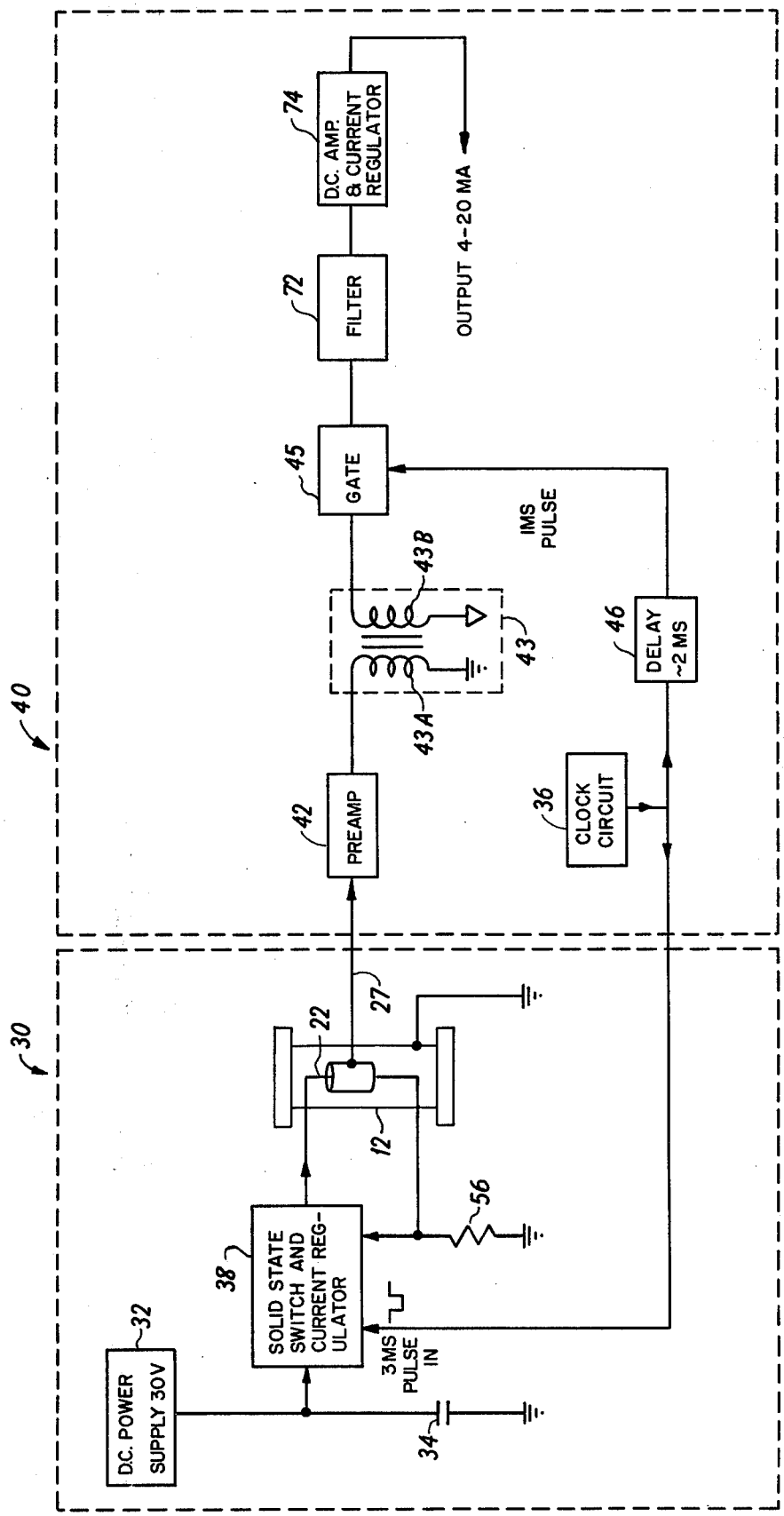
FIG. 4 is a block diagram of an electronic circuit for exciting the magnetic field and for detecting the output voltage induced therein.

As shown in FIG. 4, the voltages sensed by the two electrodes are connected to a flow signal readout circuit 40 (i.e., the secondary element) by shielded signal cable 27. The voltage readings at the output of pulse transformer 43 are gated into the secondary element in synchronism with the magnetic field drive current pulse by means of a common clock circuit 36.

The flowmeter 10 may easily be inserted in an existing flow line by coupling the flanged ends 13, 15 of the pipe 12 to matching flanges. Since the pipe is formed of electrically conductive material and is insulated from the tubular housing 16, voltages generated by the flowing fluid may be measured between the uninsulated central portion 21 of the housing 16 and the pipe wall. This arrangement, particularly the use of the pipe wall as an electrode, provides a pair of large surface-area electrodes that effectively reduce both output flow noise and signal output impedance, thereby permitting measurement of low conductivity fluids. Additionally, such a construction eliminates the need for bonding an insulating liner to the interior of the pipe to isolate the two electrodes. Thus an effective pressure seal is achieved by simply placing end gaskets (not shown) between the respective flanges. Still further, the symmetry afforded by this concentric electrode configuration assures proper performance irrespective of orientation of the meter structure within the flow line.

The pulse switching network 30 supplies the necessary excitation current to the field coil 22 at a rate of 7.5 pulses per second. The clock circuit 36 provides 3 millisecond pulses at the appropriate repetition rate obtained by dividing the 60 Hz line frequency by eight and feeds these pulses to a solid state switch and current regulator 38. The switch and current regulator serves to connect the capacitor 34 to the field coil for 3 milliseconds, 7.5 times per second to produce a corresponding current pulse of nominally 40 amperes in the field coil (see FIGS. 6A and 6B). Because of this low duty cycle, the power supply needs to supply only about 1 ampere of average charging current to the storage capacitor 34 and each pulse produces only a very slight drop in voltage across the capacitor. As a consequence, the current regulator can maintain the field current accurately at the desired value.

Figure 5:
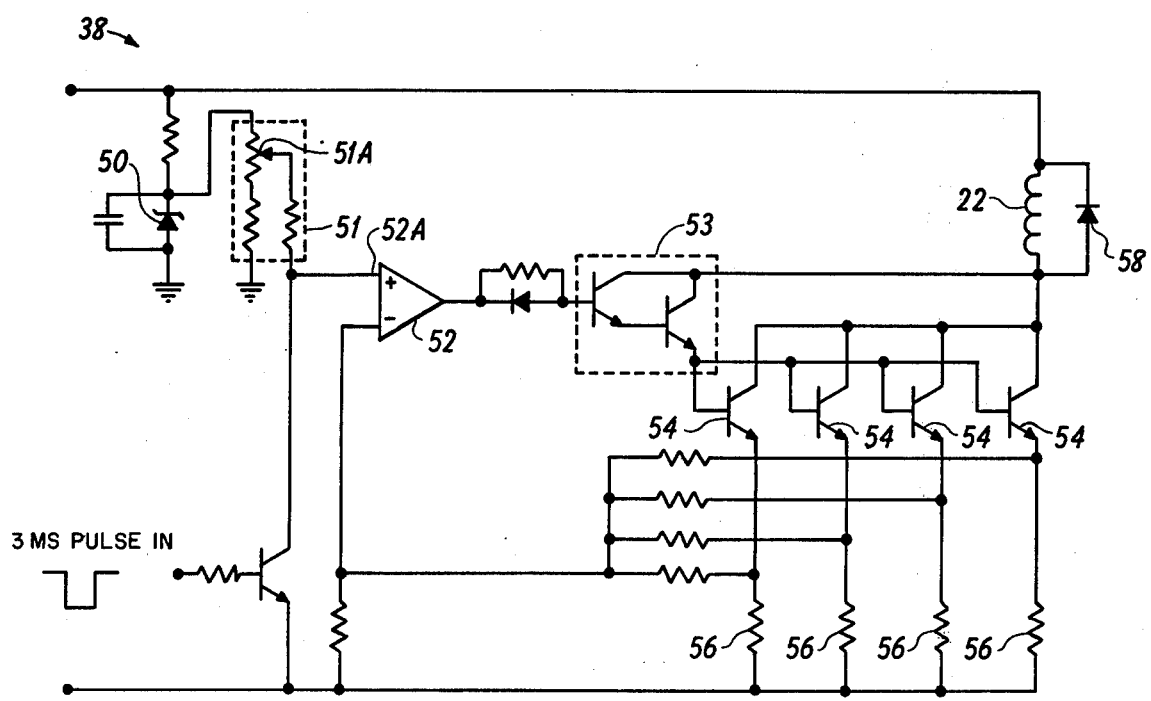
FIG. 5 is a schematic diagram of the magnetic field drive circuitry.

FIG. 5 shows the details of the solid state switch and current regulator 38. The power supply voltage is first divided down by the combination of a reference diode 50 and a resistor network 51 to establish the proper bias level at the non-inverting terminal 52A of high gain amplifier 52. For reasons to become apparent immediately below, this bias level is adjustable over a preselected range by means of a potentiometer 51A. The pulses applied to input terminal 52A trigger the amplifier. The output of the amplifier 52 drives a Darlington pair 53, which in turn drives four identical switching transistors 54 arranged in parallel, whose outputs are summed to provide 40 amperes to the field coil 22. A group of current sensing resistors 56, each of nominally 1 ohm (one resistor associated with each of the switching transistors), in series with the field coil provides negative feedback for the amplifier 52 to regulate the current supplied to the coil.

Since the current to the field coil 22 is regulated, and since this regulated value may be adjusted by the potentiometer 51A, all primary elements of a given size (e.g., 4 inch I.D. meters) can be factory set to have the same calibration factor (i.e., the number of millivolts of output signal for a given flow rate). The elimination of field calibration facilitates on-site replacement of meters as well as minimizes overall system outage. Current regulation affords other significant advantages by eliminating the need to compensate the flow signal for changes in magnetic field strength as well as allowing excess voltage to be applied to reduce the rise time of the field current pulse.

Figure 3:
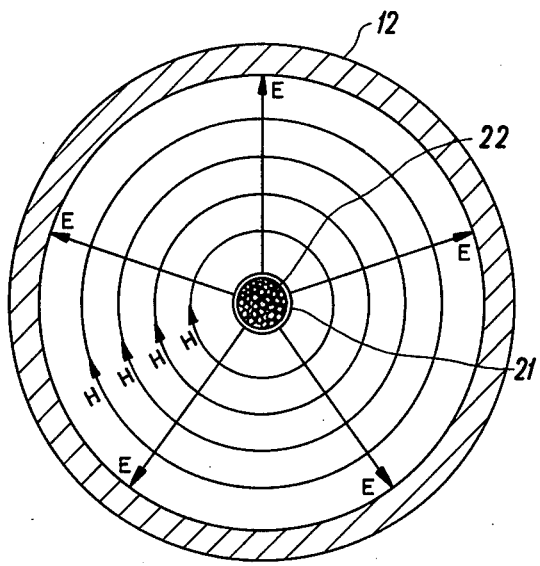
FIG. 3 is a view looking down the bore of the pipe showing in generalized form the magnetic field distribution in the region around the inner electrode.

While current is on, a magnetic field exists within the pipe whose lines of force form generally concentric circles about the inner electrode 21 in the region of effective fluid flow measurement as is shown in FIG. 3. Because the current is regulated, the intensity of the field is known; therefore, the interaction of the flowing conductive fluid with the field generates an output voltage sensed between the inner electrode 21 and the pipe 12 which has a known proportionality to the flow rate. In the embodiment described, a flow rate of 10 feet/second generates an output signal of 2 millivolts.

The use of short-duration, high-current pulsed magnetic field drive circuitry, as opposed to a steady-state or a-c field excitation, significantly reduces overall energy consumption of the meter and minimizes power dissipation in the switching and regulating devices. Also, as previously explained, pulsed d-c field drive makes the flow signal readout circuitry insensitive to a-c line voltage, frequency and harmonic distortion.

It is especially advantageous to use short, well-defined field current pulses that rise to steady-state value and decay to zero in as short a period as possible so as to produce corresponding flow induced electrode output voltages. As will be discussed below, such pulsed output voltages are more readily transmitted to the secondary element for further processing and may be easily isolated from the galvanic voltages and any other extraneous voltages sensed by the electrodes. Additionally, the unique electrode construction of the present invention provides large surface-area contact with the process fluid and hence a high degree of output noise immunity which enhances overall measurement accuracy when periodically sampling the signal by essentially eliminating the possibility of sensing noise peaks.

The establishment of a 3 millisecond pulse length is determined essentially by the time constant (rise and decay time) of the field coil 22, which is 0.4 milliseconds. The rise time is further reduced by applying a higher input voltage than that required to produce 40 amperes, while still maintaining control of the current applied to the field coil 22 through means of the regulating circuitry discussed above. This steady-state current can be reached in less than 2 milliseconds which allows at least 1 millisecond of constant current for making flow measurements.

Another factor concerning the switching response characteristics of the drive circuitry as well as output measurement accuracy is the effective balancing of transients that the inductively coupled between the leg segments 17A, 17B of the tubular housing 16 as a result of the rise or fall of current in the field coil 22 and the pipe 12 through the flowing fluid. As is evident from the opposed direction of current flow through each leg, these induced transients form two conductive loops of opposite polarity. To null these transients so that the net induced potential as seen between the shield and the center conductor of the output signal cable 27 is essentially zero, a potentiometer 60 (shown schematically in FIG. 2) is connected between the legs with its sliding contact going to the center conductor of the signal cable 27. In this manner the output signal take off point can be adjusted readily to have the same transient potential as the grounding point of the shield of the signal cable, whereby the induced transient voltages can be effectively eliminated from the signal circuits.

Conversely, the speed of the decay of the current to zero is influenced by the energy in the field of the coil 22 that must be disspated. For a 40 ampere coil current the collapse of the resulting field requires the absorption of about 0.22 joules. At a 7.5 per second repetition rate the average power to be dissipated is 1.65 watts. Such a low average power level can be reasonably absorbed by a damping diode 58 connected across the field coil, which acts as a short circuit to the reverse voltage produced by the collapsing magnetic field, thereby greatly reducing the time needed to return to zero field current.

Figure 6A:
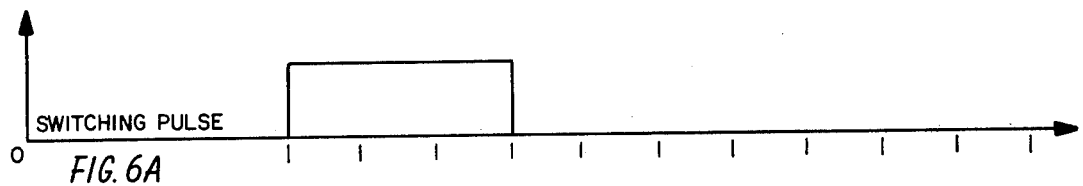
Figure 6B:
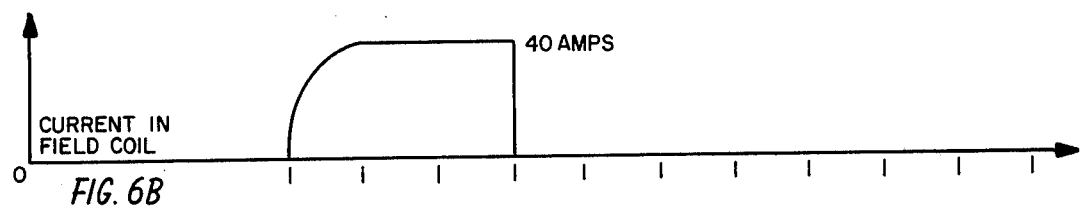
Figure 6C:
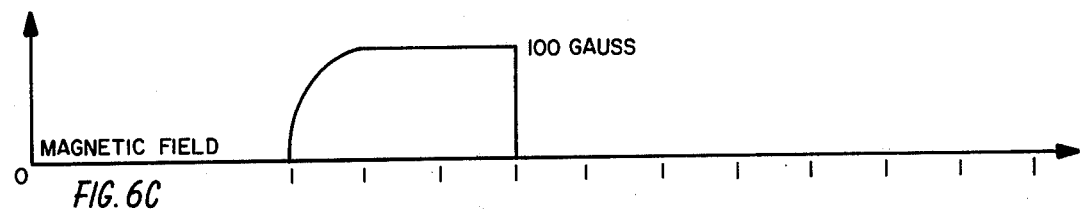
Figure 6D:
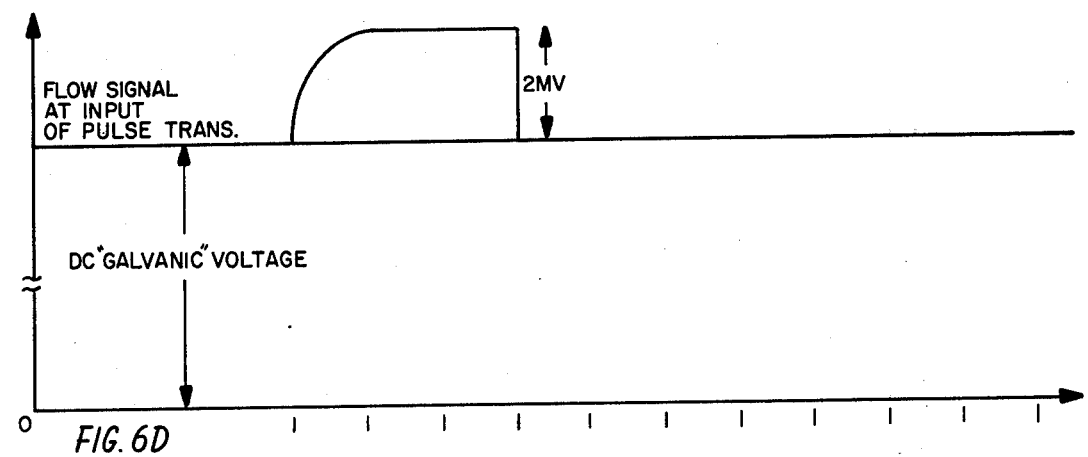
Figure 6E:
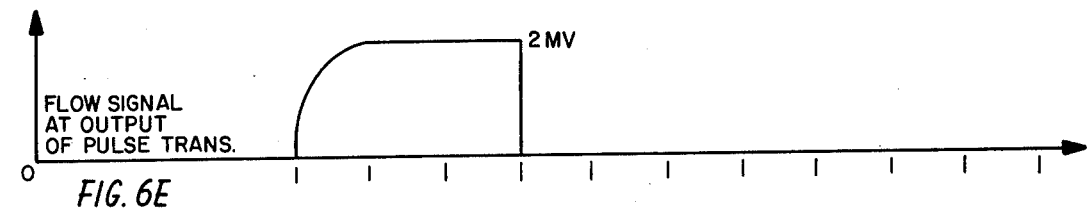
Figure 6F:
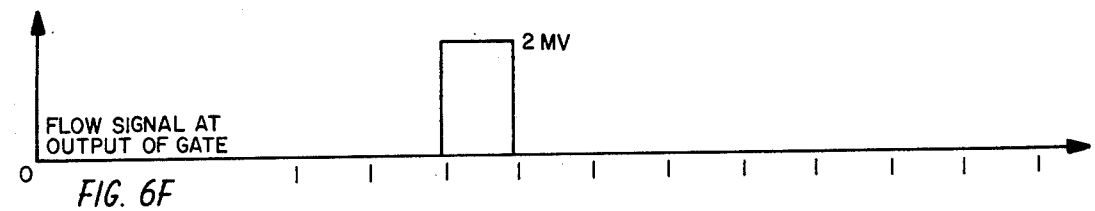

Turning now to FIGS. 4 and 6A-F, there is shown the details of the secondary element 40 for obtaining the flow signal readout. As discussed, the clock 36 produces 3 millisecond pulses at a repetition rate of 7.5 times per second which activates the switch and current regulator 38 to produce a current in the field coil 22 and a corresponding magnetic field within the pipe 12 (FIGS. 6A-C). The flow induced signal voltage which appears across the two electrodes includes two values, a first value proportional to flow rate (i.e., flow signal) superimposed on a d-c voltage that is approximately equal to the galvanic potential at the electrodes. This flow induced voltage is amplified by a preamplifier 42 to produce the waveform shown in FIG. 6D. The signal is then fed to the input 43A of a pulse transformer 43, which passes only the pulsed flow signal to its output 43B (FIG. 6E), thereby effectively isolating the d-c component from the remainder of the detection circuitry.

As is evident from FIG. 4, the pulse transformer 43, in addition to providing a d-c block, isolates the grounding system of the sensing electrodes from that of the readout circuitry. Providing a separate ground for the output measurement circuitry is important in process control applications where it is undesireable to have process controllers tied to a specific grounding system.

The clock 36 simultaneously delivers pulses to the secondary element 40 that are synchronized with the field drive circuitry. Approximately 2 milliseconds after the current is turned on as determined by a delay 46, a gate 45 is opened for 1 millisecond to admit the flow signal appearing at the output 43B of the pulse transformer 43. Thus this sampled signal (FIG. 6F) is taken at a time when the current in the field coil is constant. The resultant signal is then fed to a filter 72 and a d-c current regulator 74 to produce an output signal compatible with industrial instrumentation requirements (i.e., typically 4–20 milliamperes) which is proportional to the flow rate.

Any changes in the flow rate are detected by repeating the entire measurement cycle shown in FIGS. 6A-F at a rate of 7.5 times per second.

OTHER EMBODIMENTS

Although a preferred embodiment has been set forth in detail above, it is to be emphasized that this is solely for the purposes of illustrating the present invention and is not to be considered limiting. For example, if it is desirous to use d-c measurement techniques to obtain the flow readout for those applications in which ground isolation is not required or where isolation may be provided at a later stage in the system, then the embodiment shown in FIG. 7 may be used in conjunction with the pulsing techniques discussed above. In this embodiment, two electrode voltage readings are sampled, one signal reading made during the latter portion of the field current pulse when the magnetic field is at steady-state on value, and the other immediately after the field current is turned off when this generated field is zero and only galvanic and any other extraneous voltages are sensed by the electrodes. The difference between these two voltage readings is the actual flow signal. Since these two readings are made within a few milliseconds of one another, the drift in the galvanic voltage is negligible. Thus, no additional circuitry to compensate for baseline drifts is required.

The synchronous operation of the clock circuit 36 with respect to the field drive circuitry and secondary element is as before. However, the electrode output voltage after being amplified by the preamplifier 42 is then applied to conventional sample and hold circuits 44A, 44B in parallel.

Approximately 2 milliseconds after the current is turned on as determined by the delay 46, the sample and hold circuit 44A is opened for 1 millisecond to admit the "flow" signal, which is actually a composite of flow induced and galvanic potentials. After a further delay of 3 milliseconds interposed by a second delay 47 and when the field current is zero, the other sample and hold circuit 44B is gated open for 1 millisecond to read the voltage potential between the electrodes, i.e., the "zero" signal reading.

The clock pulses after passing through a third delay 48 of approximately 3 milliseconds are then delivered to two gate circuits 49A, 49B which feed both the "flow" and "zero" signalssimultaneously to a differential amplifier 70. The output of the differential amplifier represents the actual flow rate signal i.e., "flow" signal minus "zero" signal. This signal is then fed as before to the filter 72 and d-c current regulator 74 to produce the appropriate output signal.

Additional changes in the electronics are also possible as the rise and decay time constant for the field coil could be made as high as 2 milliseconds, with a corresponding increase in pulse widths of up to 10 milliseconds and a decrease in current level to 20 amperes to obtain readily useable output signals. Additionally, the field drive circuitry of the present invention is adapted for use with magnetic flowmeter systems having externally mounted magnetic field coil structures by altering these coil structures to provide similarly low time constants so that they can be driven by the current pulse circuitry.

Modifications may be similarly made to the primary element wherein the tubular housing 16 could be totally insulated from the process fluid, and a separate inner electrode could be positioned around the insulated housing. Another possible variation would be to mount the tubular housing so that the two leg segments 17A, 17B would not be in the same plane. This would serve to prevent vibration of the housing when used in turbulent, high velocity fluids.

It will be obvious to those skilled in the art that other variations are possible without departing from the scope of the present invention as set forth in the accompanying claims.

What is claimed is:

1. A magnetic flowmeter comprising:
   a conduit for carrying a flowing fluid having an electrically conductive portion;
   a field coil having a portion extending substantially along the longitudinal axis of said flow conduit within said conductive portion for producing a concentric magnetic field generally perpendicular to said longitudinal axis;
   an inner electrode around said longitudinal coil portion and extending longitudinally of said flow conduit conductive portion near said coil portion; and
   means for insulating said inner electrode from said conductive portion, whereby said conductive portion serves as a large surface-area electrode.

2. The meter of claim 1 in which the opposite ends of said longitudinal coil portion are bent to extent through the walls of said flow conduit, and including a housing for said field coil mounted to the walls of said flow conduit.

3. The meter of claim 2 in which said housing has an electrically conductive portion at least along said longitudinal field coil portion;
   said housing conductive portion being insulated from said flow conduit, whereby said housing conductive portion serves as said inner electrode.

4. The meter of claim 3 in which said flow conduit is a pipe;
   said housing is a tube that extends longitudinally a distance of at least twice the pipe diameter;
   said housing conductive portion extending longitudinally a distance of one and one-half times the pipe diameter.

5. The meter of claim 2 in which said field coil is formed by pulling a plurality of insulated electrical conductors through said housing and serially interconnecting said conductors externally of said flow conduit, thereby providing a multi-turn current winding within said flow conduit.

6. The meter of claim 2 including means coupled to said field coil for generating a magnetic field within said flow conduit that periodically varies between two magnetic field values.

7. The meter of claim 6 in which said magnetic field generating means is a switching network that delivers current pulses to said field coil;
   said magnetic field varying between predetermined field current and zero field current values.

8. The meter of claim 7 in which said switching network comprises:
   a d-c power supply;
   a capacitor charged to a predetermined value by said power supply;
   switch means coupled to said capacitor to periodically apply said charged value to said field coil.

9. The meter of claim 8 in which said switch means comprise electronic solid state switching devices having a predetermined input bias level triggered by a pulsed input to produce a corresponding current pulse to said field coil.

10. The meter of claim 9 including a diode connected across said field coil for absorbing energy stored therein when said magnetic field collapses toward said zero current field value, thereby greatly reducing the time needed to return to zero field current.

11. The meter of claim 9 including feedback means to regulate the current applied to said field coil, thereby producing a magnetic field of known intensity within said conduit.

12. The meter of claim 11 in which said input bias level is adjustable over a range permitting all flow conduits of a given size to be manufactured with the same calibration factor, whereby field installation of new meters is facilitated.

13. The meter of claim 9 including a clock circuit for providing said pulsed input at a constant repetition rate, said clock circuit derived from a divider circuit coupled to the a-c power line frequency.

14. The meter of claim 13 in which said repetition rate is 7.5 pulses per second.

15. The meter of claim 7 including means coupled to said inner electrode and said flow conduit conductive portion for sensing voltages thereacross induced by said flowing fluid intersecting said magnetic field.

16. The meter of claim 15 in which said sensing means is synchronized with said magnetic field generating means to measure said flow induced voltages when said magnetic field has reached its steady-state on value.

17. A magnetic flowmeter for measuring the velocity of a flowing fluid comprising:
   a first electrode;
   a second electrode;
   a field coil for producing a magnetic field generally perpendicular to the flow;
   means for delivering a current pulse through said field coil causing said magnetic field to vary between a steady-state on condition and an off condition;
   said flowing fluid interacting with said varying magnetic field to produce a voltage across said first and second electrodes when said magnetic field is on that includes two components, a pulsed signal proportional to flow rate superimposed on a d-c signal substantially equal to the galvanic potential formed at said electrodes;
   detection circuitry having an input and an output and receiving at said input said voltage in synchronism with said current pulse means;
   said detection circuitry including a transformer arranged to pass to said output said pulsed signal proportional to flow rate while blocking substantially all of said galvanic potential, said transformer also providing isolation between the ground reference of said electrodes and that of said output.

18. The meter of claim 17 in which the rise and decay time constant of said field coil is less than 2 milliseconds;
   said current pulse is at least 20 amperes and less than 10 milliseconds in duration;
   said pulse delivering means producing current pulses at a repetition rate of 7.5 pulses per second.

19. The meter of claim 18 in which said field coil has a portion extending substantially along the longitudinal axis of a flow conduit and end portions bent to extent through the walls of said conduit.

20. The meter of claim 19 in which said detection circuitry is coupled to said electrodes by a shielded cable.

21. The meter of claim 20 including means for nulling inductively coupled switching transients from said detection circuitry.

22. The meter of claim 21 in which said switching transient nulling means is a potentiometer connected between said end portions of said field coil and having its sliding contact connected to the center conductor of said shielded cable so that the output signal take off point can be adjusted to have the same transient potential as the grounding point of the shield of said cable, whereby induced transient voltages can be effectively eliminated from said detection circuitry.

* * * * *